United States Patent [19]

Segal et al.

[11] Patent Number: 4,685,101
[45] Date of Patent: Aug. 4, 1987

[54] DIGITAL MULTIPLEXER FOR PCM VOICE CHANNELS HAVING A CROSS-CONNECT CAPABILITY

[75] Inventors: Henry P. Segal, Ridgefield, Conn.; Carl Dewilde, Stony Brook, N.Y.

[73] Assignee: Siemens Aktiengesellschaft, Berlin and Munich, Fed. Rep. of Germany

[21] Appl. No.: 683,901

[22] Filed: Dec. 20, 1984

[51] Int. Cl.⁴ .......................... H04J 3/22; H04J 3/04
[52] U.S. Cl. ...................................... 370/84; 370/85; 370/89; 370/112; 370/102
[58] Field of Search ................... 370/85, 112, 89, 86, 370/84, 102

[56] References Cited

U.S. PATENT DOCUMENTS

| | | | |
|---|---|---|---|
| 4,244,046 | 1/1981 | Brouard et al. | 370/84 |
| 4,322,844 | 3/1982 | Fellinger et al. | 370/84 |
| 4,340,961 | 7/1982 | Capel et al. | 370/84 |
| 4,504,943 | 3/1985 | Nagano et al. | 370/84 |
| 4,530,093 | 7/1985 | Akram et al. | 370/85 |
| 4,570,257 | 2/1986 | Olson et al. | 370/85 |

OTHER PUBLICATIONS

Digital Access and Cross-Connect System-System Architecture R. P. Abbott and D. C. Koehler, pp. B1.2.1–B1.2.7.
DACS Features and Applications J. R. Colton and A. J. Osofsky; pp. B1.1.1–B1.1.7.
DACS Microprocessor System A. J. Cirillo, L. F. Horney II, J. D. Moore; pp. B1.2.1–B1.2.6.
DACS in an Associated Company L. C. Sweeney; pp. B1.4.1–B1.4.3.

Primary Examiner—Douglas W. Olms
Assistant Examiner—Curtis Kuntz
Attorney, Agent, or Firm—Jeffrey P. Morris

[57] ABSTRACT

A digital multiplexer for PCM voice communication is disclosed which operates to multiplex PCM voice channels on DS1, DS1C and DS2 digital transmission lines into one or more DS3 transmission lines and vice versa. On one side of the multiplexer are a number of terminals for connection to the low speed transmission lines. These terminals may be divided into "first terminals" adapted for connection to the incoming branch lines of the low speed (DS0, DS1, DS1C., DS2), duplex PCM highways and "second terminals" adapted for connection to the outgoing branch lines of the respective low speed, duplex PCM highways. On the opposite side of the system are a second set of terminals for connection to the high speed transmission lines. These terminals may be divided into "third terminals" adapted for connection to the incoming branch lines of the respective high speed (DS3), duplex PCM highways and "fourth terminals" adapted for connection to the outgoing branch lines of the respective high speed, duplex PCM highways. A bus network is arranged within the system for routing both digital data (voice samples) and destination or origination addresses throughout the system. The multiplexer operates to route each PCM voice sample received on any voice channel at a first or third terminal to any other PCM voice channel for outgoing transmission at a second or fourth terminal.

13 Claims, 15 Drawing Figures

FIG. 13 ically to multiplex PCM -->

DIGITAL MULTIPLEXER FOR PCM VOICE CHANNELS HAVING A CROSS-CONNECT CAPABILITY

BACKGROUND OF THE INVENTION

The present invention relates to a digital multiplexer for PCM voice communication and, more particularly, a digital multiplexer which operates to multiplex PCM voice channels on DS1, DS1C and DS2 digital transmission lines into one or more DS3 transmission lines and vice versa.

The standard for digital multiplexers operating to multiplex DS1, DS1C and DS2 transmission lines into a DS3 transmission line are set forth and discussed in the *Bell System Transmission Engineering Technical Reference* entitled "Digital Multiplexes, Requirements and Objectives" by the Director, Exchange Systems Design, A T & T (July, 1982). Digital multiplexers which are connected into the Bell System pulse code modulated (PCM) voice signal network must conform with this standard.

As is well known, a single PCM voice channel, known as a "DSO" channel, operates at 64 kilobits per second (Kb/sec) to transmit 8,000 8-bit voice samples per second. According to the Bell standard, individual voice channels are multiplexed into higher speed channels for long distance transmission. As a particular example, 24 DSO channels may be multiplexed into a "DS1" channel operating at 1.544 Mb/sec. In this format, 24 8-bit samples, one from each DS0 channel, are arranged serially in a single transmission frame together with a framing bit to form a 193-bit frame. Transmission of successive 193-bit frames at a rate of 8,000 frames per second determines the bit rate of 1.544 Mb/sec. Set forth in the following table are the Bell standard digital transmission lines with their associated transmission rates and numbers of voice channels:

TABLE

| Transmission Line | Number of Voice Channels | Transmission Rate |
| --- | --- | --- |
| DS0 | 1 | 64 Kb/sec. |
| DS1 | 24 | Approx. 1.5 Mb/sec. |
| DS1C | 48 | Approx. 3 Mb/sec. |
| DS2 | 96 | Approx. 6 Mb/sec. |
| DS3 | 672 | Approx. 45 Mb/sec. |

Figure 1:
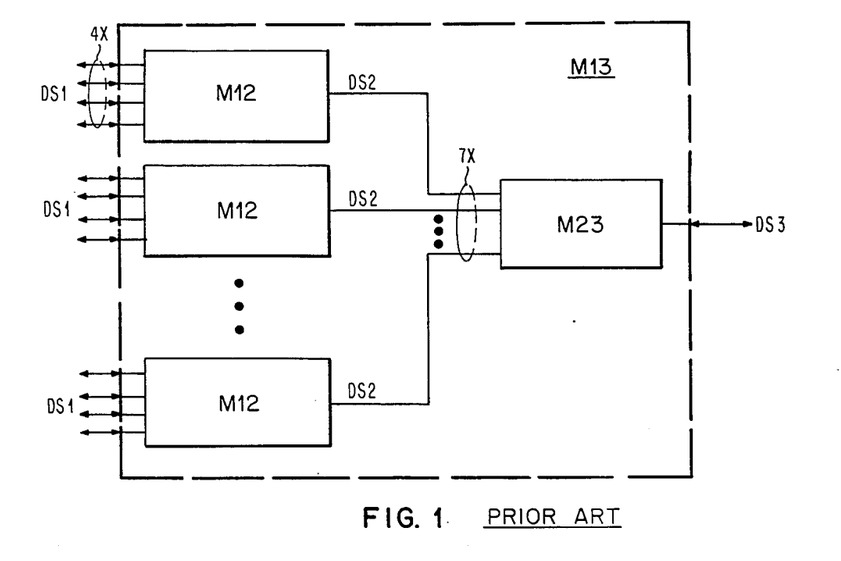
FIG. 1 is a block diagram of a "M13" multiplexer which concentrates 28 DS1 transmission lines into a single DS3 transmission line.
Figure 2:
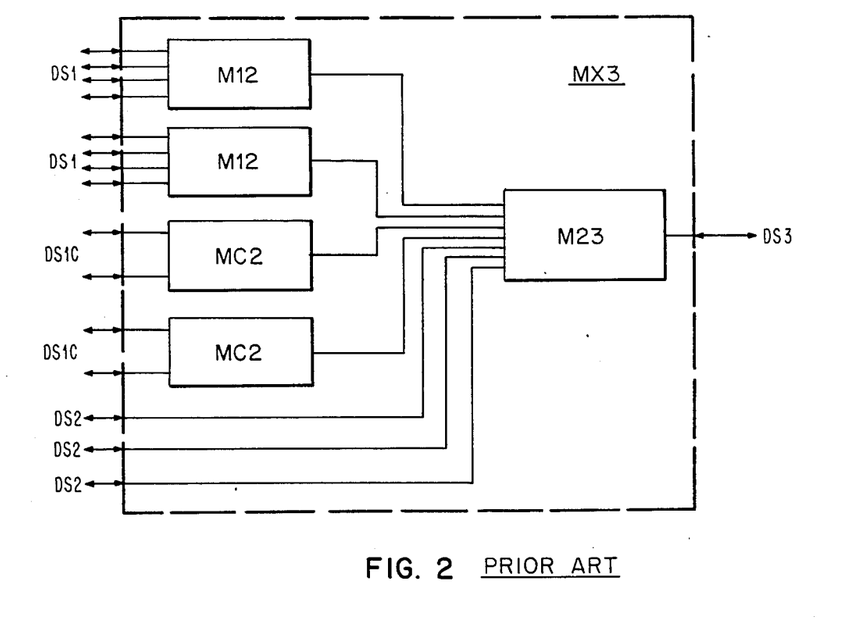
FIG. 2 is a block diagram of a "MX3" multiplexer which concentrates a plurality of DS1, DS1C and DS2 transmission lines into a single DS3 transmission line.
Figure 3:
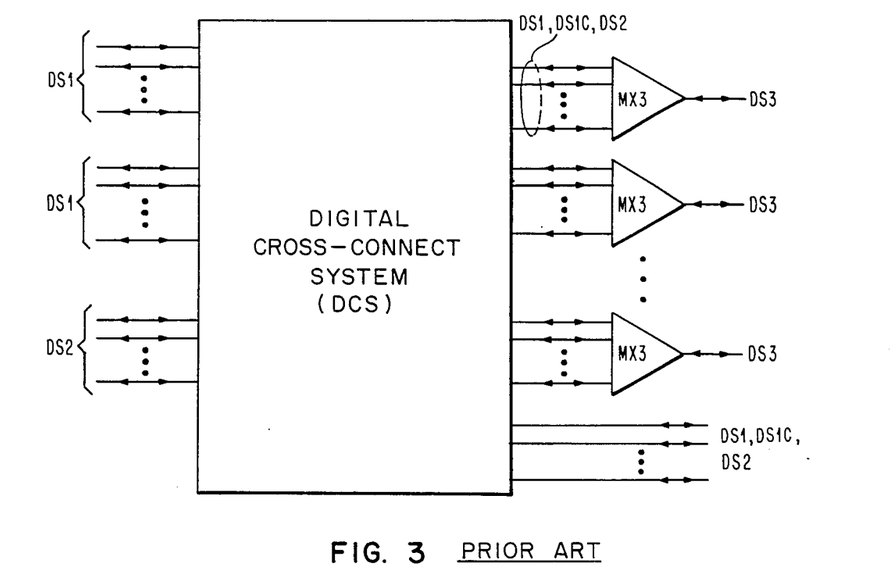
FIG. 3 is a block diagram of a network node having a digital cross-connect system and a plurality of MX3 multiplexers.

FIGS. 1-3 of the drawings depict the structure and nomenclature of conventional, state-of-the-art equipment for connecting together digital PCM voice transmission lines having different transmission rates. FIG. 1 shows a so-called "M13" multiplexer which multiplexes 28 DS1 transmission lines into a single DS3 transmission line. As is shown, this is accomplished by providing seven M12 multiplexers, each of which multiplexes four DS1 lines into a single DS2 line, and providing a single M23 multiplexer which multiplexes seven DS2 lines into a single DS3 line.

Additional flexibility is provided by a so-called "MX3" multiplexer which is represented in FIG. 2. The MX3 multiplexer is capable of connecting different numbers of DS1, DS1C and DS2 lines to a single DS3 line. As is shown in this particular example, the seven DS2 lines connected to the M23 multiplexer are formed by concentrating two groups of four DS1 lines, concentrating two groups of two DS1C lines and by direct connection to three DS2 lines. As will be appreciated, the "X" in the MX3 multiplexer designation refers to the fact that three different types of transmission lines—namely DS1, DS1C and DS2—are connectable to this device.

FIG. 3 illustrates a complete switching "node" which connects a variable number of DS1, DS1C, DS2 and DS3 lines as inputs and outputs and routes any voice channel on any one line to a voice channel on any other line. This is accomplished with the aid of a digital cross-connect system (DCS) which operates in the manner of a telephone exchange to connect any incoming transmission line to any outgoing transmission line. One such digital cross-connect system is currently marketed by Western Electric under the acronym "DACS" (Digital Access and Cross-Connect System). This known cross-connect system provides a crosspoint array to enable any transmission line of one transmission rate to be connected to any other transmission line of like transmission rate.

Conversion from one transmission rate to another is effected by a plurality of MX3 multiplexers. M12 and MC2 multiplexers (not shown) may also be provided, as desired, to convert to a DS2 transmission rate.

While equipment of the type illustrated in FIG. 3 may be tailored to voice transmission network nodes of any configuration, such equipment is not readily programmable so that changes in the node configuration are expensive and time consuming. This equipment includes certain dedicated multiplexer hardware which must be physically interconnected into or removed from the system each time a change is made.

SUMMARY OF THE INVENTION

It is an object of the present invention to provide apparatus for interconnecting a plurality of digital transmission lines having different transmission rates which is readily programmable and therefore easily modifiable so as to change the node configuration.

It is a further object of the present invention to provide apparatus of the above described type which is capable of both rerouting PCM voice channels as well as concentrating or dispersing PCM voice channels to or from high speed (DS3) transmission lines respectively.

These objects, as well as other objects which will become apparent from the discussion that follows, are achieved, according to the present invention, by providing a system of the following configuration:

On one side of the system are a number of terminals for connection to the low speed transmission lines. These terminals may be divided into "first terminals" adapted for connection to the incoming branch lines of the low speed (DS0, DS1, DS1C, DS2), duplex PCM highways and "second terminals" adapted for connection to the outgoing branch lines of the respective low speed, duplex PCM highways. On the opposite side of the system are a second set of terminals for connection to the high speed transmission lines. These terminals may be divided into "third terminals" adapted for connection to the incoming branch lines of the respective high speed (DS3), duplex PCM highways and "fourth terminals" adapted for connection to the outgoing branch lines of the respective high speed, duplex PCM highways.

A bus network is arranged within the system for routing both digital data (voice samples) and destination or origination addresses throughout the system. The bus includes a number of bus lines for transmission of data, half of which are denominated "transmitting bus data lines" and the other half of which are denominated "receiving bus data lines". Additional bus lines are used for transmitting addresses throughout the system. Half of these additional lines, denominated "transmitting bus address lines" are associated with the transmitting bus data lines. The other half of these additional lines, denominated "receiving bus address lines" are associated with the receiving bus data lines. Both the bus data lines and the bus address lines are grouped into "sets" for parallel transmission of data (voice samples) and addresses.

Also included in the system are a number of "low speed modules". Each low speed module couples at least one of the aforementioned first terminals to each set of the transmitting bus data lines and couples at least one of the aforementioned second terminals to each set of the receiving bus data lines. Each low speed module is also connected to the transmitting bus address lines and to the receiving bus address lines.

The system also includes a number of "high speed modules". Each high speed module couples a single one of the aforementioned third terminals to a set of the receiving data bus lines and couples a single one of the aforementioned fourth terminals to a set of the transmitting bus data lines. Each high speed module is also connected to a set of the transmitting bus address lines and to a set of the receiving bus address lines.

The system operates to route each PCM voice sample received on any voice channel at a first or third terminal to any other PCM voice channel for outgoing transmission at a second or fourth terminal. This routing is accomplished by programming the high speed modules to apply an address to a corresponding transmitting and receiving bus address line set at the same time that a PCM voice sample is applied to a transmitting or receiving data line set. This address designates either the originating or recipient module plus the time slot in the originating or destination PCM highway. Since each of the low-speed modules monitors all of the data and address buses, that low speed module connected to the destination PCM highway will receive, store and subsequently transmit the PCM voice sample on the proper highway in the proper time slot.

Other features and advantages of the invention will be apparent from the following description of the preferred embodiment, and from the claims. For a full understanding of the present invention, reference should now be made to the following detailed description of the preferred embodiment and to the accompanying drawings.

DESCRIPTION OF THE PREFERRED EMBODIMENT

The preferred embodiment of the present invention will now be described with reference to FIGS. 4–13 of the drawings. Identical elements in the various figures are designated by the same reference numerals.

Figure 4:
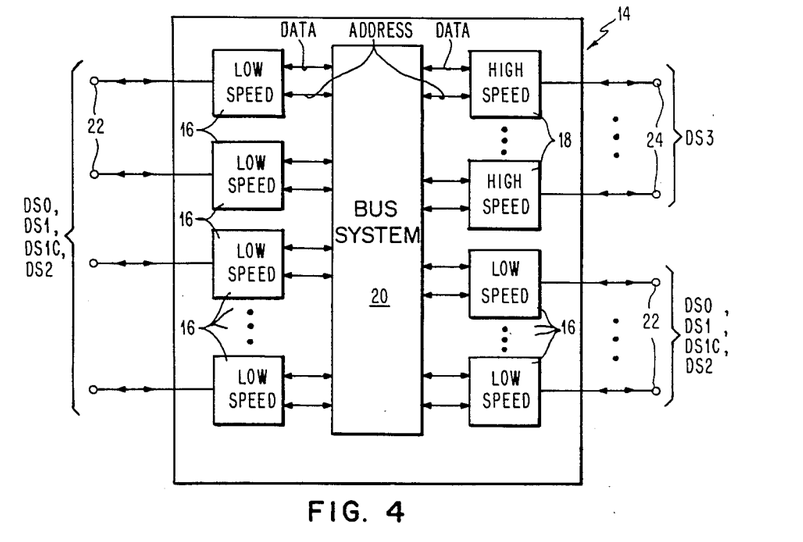
FIG. 4 is a block diagram of apparatus according to the invention for both rerouting and concentrating (dispersing) PCM voice channels.

FIG. 4 illustrates the general concept of the present invention in a manner which can be compared to the conventional rerouting and concentrating system of FIG. 3. As shown in FIG. 4, the apparatus 14 comprises a number of low speed modules 16 and a number of high speed modules 18 all connected to a common bus system 20. The low speed modules are connected to input/output terminals 22 which are adapted for connection to low speed transmission lines (DS0, DS1, DS1C and DS2). The high speed modules 18 are connected to input/output terminals 24 which are adapted for connection to DS3 transmission lines. Both the low speed and high speed modules separate the individual PCM voice channels from the respective incoming PCM highway branches and supply each PCM voice sample to the bus system together with a destination address. Since all modules are connected to and monitor the signals appearing on this bus system, the transmitted voice sample is received and accepted by that module which handles the designated address. This module, in turn, places the voice sample in the proper time slot and passes it to its associated output terminal.

The address for each voice sample thus comprises both space and time information which is interpreted by all modules to place this voice sample on the proper transmission line in the proper time slot.

Figure 5:
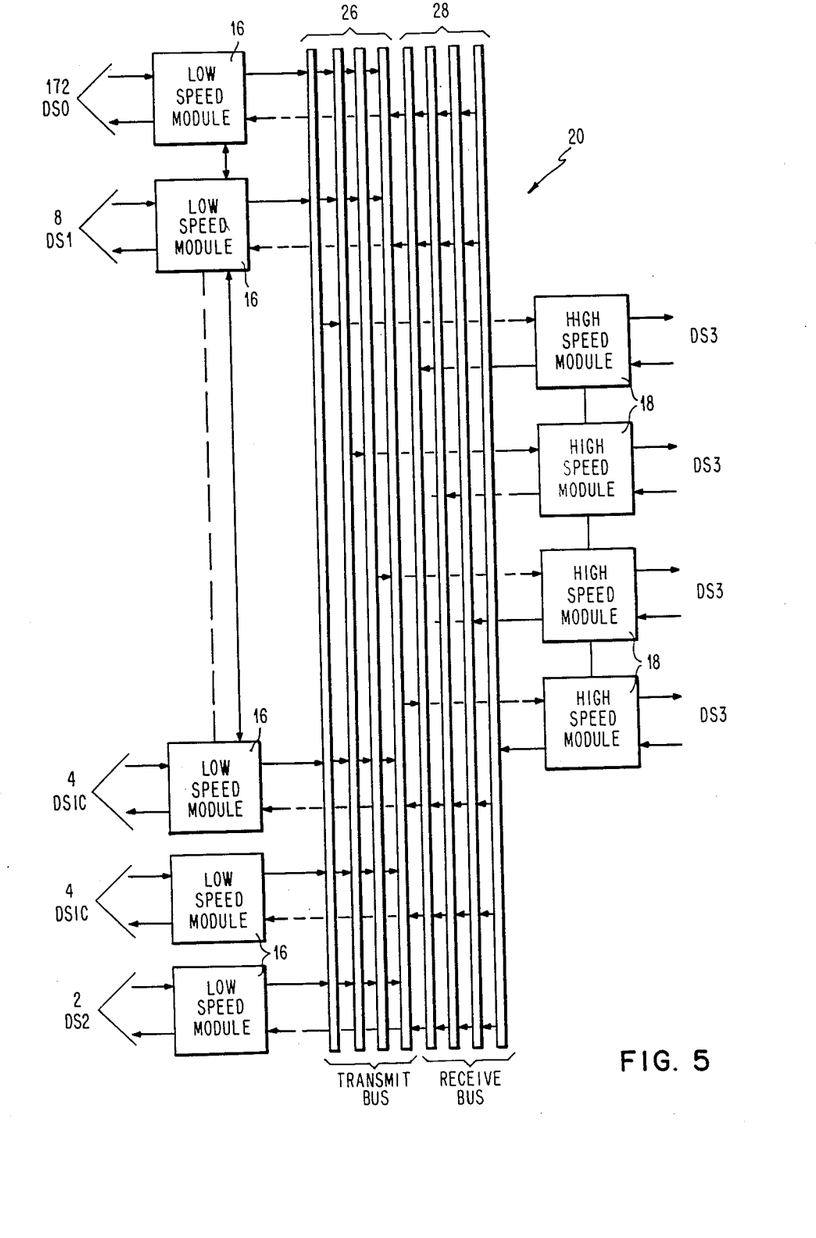
FIG. 5 is a block diagram of apparatus, according to the preferred embodiment of the present invention, for rerouting and concentrating (dispersing) PCM voice channels.

FIG. 5 depicts a particular implementation of the inventive concept illustrated in FIG. 4. In FIG. 5, all of the low speed modules are arranged on the same (left) side of the bus system 20 leaving all the high speed modules on the same (right) side of the bus system. It will be appreciated that this arrangement in no way differs from the arrangement shown in FIG. 4 since both arrangements allow any PCM voice channel on one transmission line to be routed to any other transmission line, no matter what the transmission rate of the destination transmission line may be.

It will be noted that the bus system 20 is divided into transmit bus lines 26 and receive bus lines 28. A transmit bus couples the output of each low speed module to the input of each high speed module. Similarly, a receive bus couples the output of each high speed module to the inputs of all of the low speed modules. There are four transmit buses and four receive buses for a maximum of four possible high speed modules.

Each transmit bus and receive bus comprises two bus line sets: one for data (PCM voice samples) and one for address information. There are therefore four types of bus lines: (1) transmitting bus data lines; (2) transmitting bus address lines; (3) receiving bus data lines; and (4) receiving bus address lines.

As noted above, each DS3 signal is capable of accommodating 28 DS1 signals. The input of each high speed module is therefore connected to 28 input registers which are activated one after the other in 28 cyclically repeated time slots. When in the activated or enabled condition, each input register receives data transmitted on one of the four transmitting bus data lines. The 28 input registers are enabled by a continuously running 1-to-28 counter within the respective high speed module.

Both the data and address portions of each transmit and receive bus constitute 8 wires. The 8-bit voice samples are thus transmitted (or received) on the transmit (or receive) buses and each high speed module can address one out of up to 128 possible DS1 locations (1 out of 8 sections of up to 16 low speed modules).

By transmitting the appropriate address on one of the address buses, the data of a particular section (1 out of 8) of the addressed low speed module (1 out of 16) is applied to the data transmit bus. By transmitting the appropriate address on one of the four address buses in the time slot in question, the addressed data is transmitted via the associated data transmit bus to the appropriate input register of the associated high speed module.

The apparatus is controlled by writing addresses (1 per input register of a low or high speed module) in four memories, each with 28 memory locations. The contents of the memory locations of each memory are applied sequentially for the duration of one time slot via code conversion logic circuitry to the address bus and thus determines for each time slot which 8-bit voice sample will be transmitted from a low speed module via the associated transmit data bus line. Since the time slot and transmit bus are permanently assigned to a particular high speed module, the addresses in the memory locations designate the destination high speed module and D3 transmission line.

Each data bus line transmits, time interleaved (time division multiplexed), 28 DS1 signals. The clock frequency of the bus must therefore be at least 1.544 MHz×28=44 MHz. Since this is too fast for conventional HCMOS logic, the digital signals are supplied to the bus in parallel in each time slot. The clock frequency of the bus need therefore be only above 6 MHz.

A DS1C signal is separated into two DS1 signals and then connected through in the manner described above.

Figure 6:
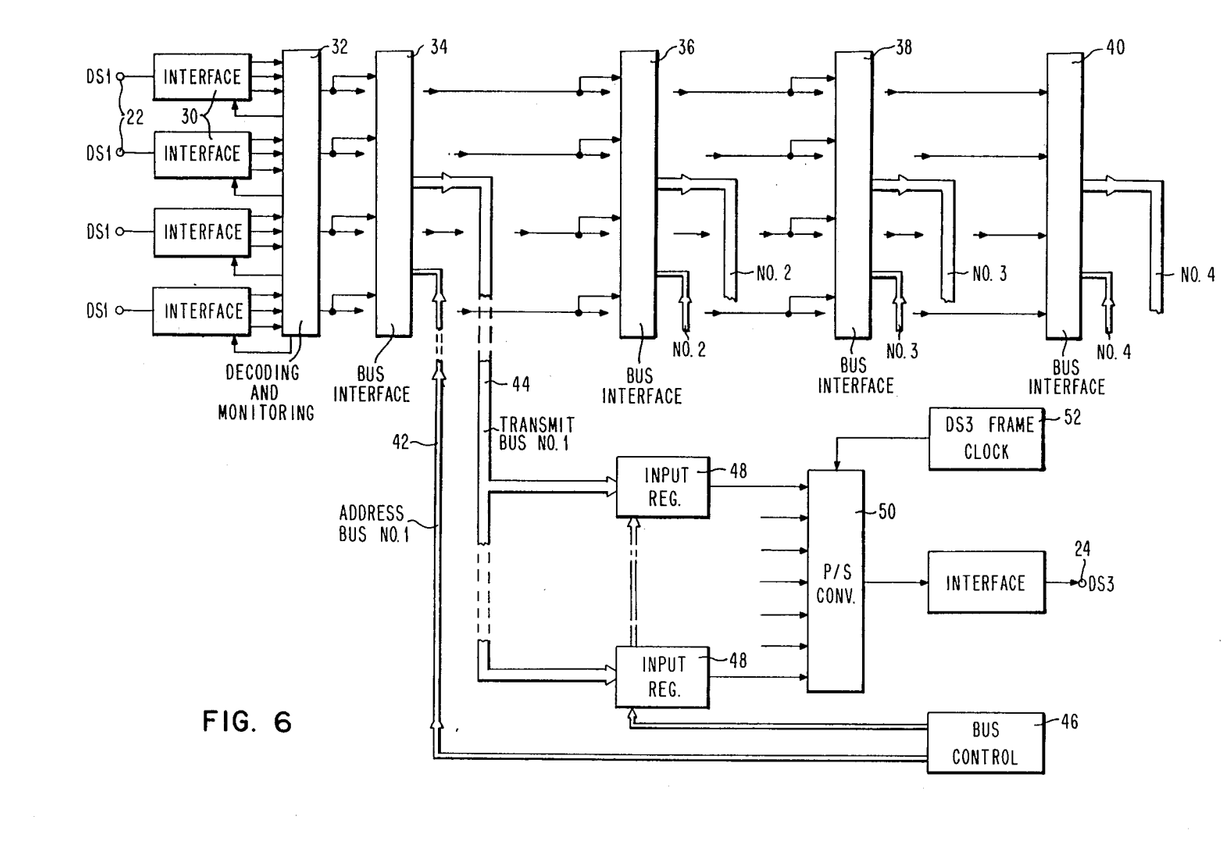
FIG. 6 is a detailed block diagram showing how PCM voice channels on four DS1 lines are routed to and concentrated for transmission on one DS3 line.
Figure 7:
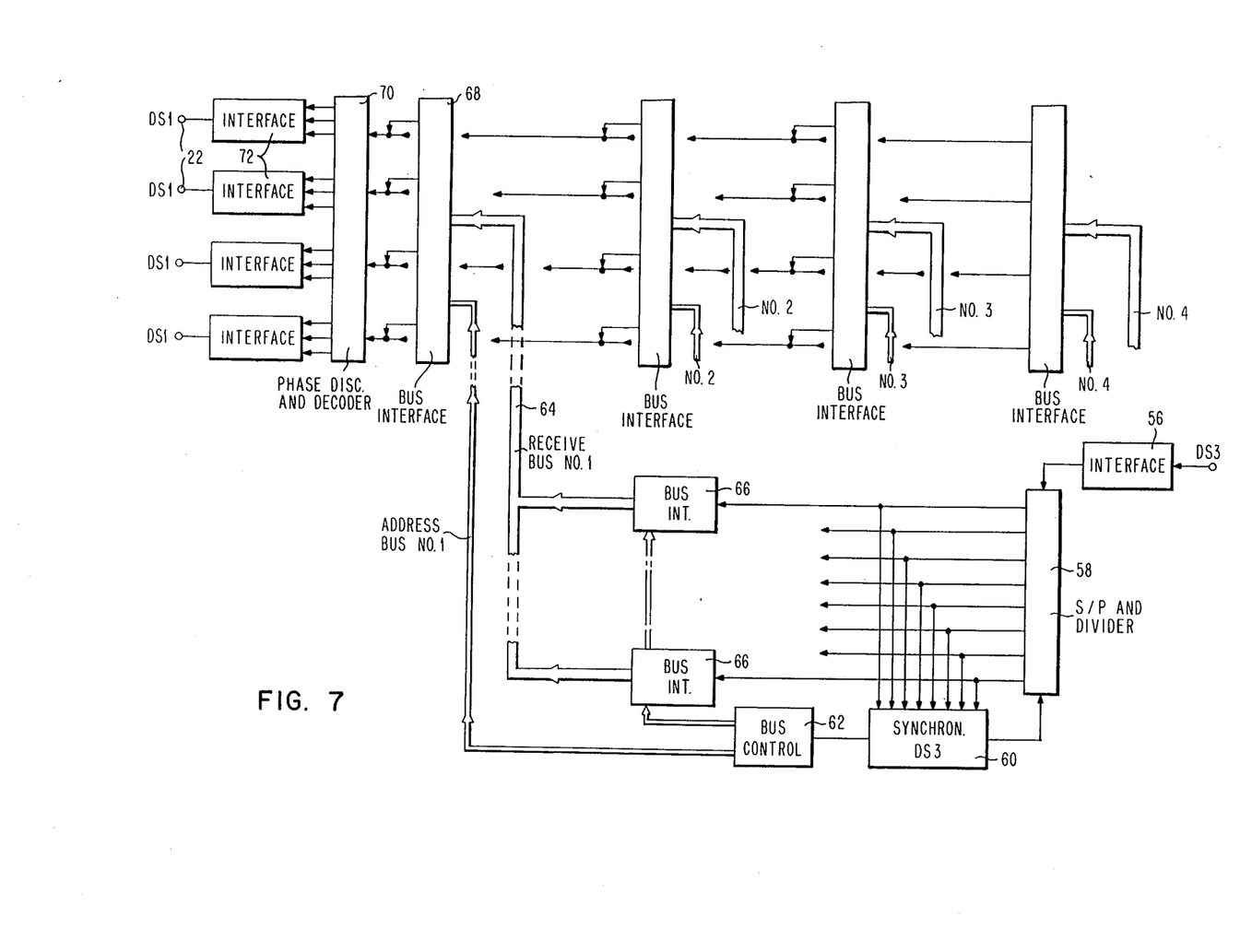
FIG. 7 is a block diagram showing how PCM voice channels on one DS3 line are routed to and distributed for transmission on four DS1 lines.

FIGS. 6 and 7 illustrate the bus interconnection between a low speed module and a high speed module. FIG. 6 shows how incoming branches of DS1 transmission lines are connected to an outgoing branch of a DS3 line. FIG. 7 illustrates the complimentary situation wherein the incoming branch of a DS3 line is directed to the outgoing branches of four DS1 lines.

Referring to FIG. 6, each DS1 terminal 22 supplies a DS1 signal to a line interface circuit 30 which passes an output to a decoding and monitoring circuit 32. Signals are made available from the circuit 32 to four bus interface circuits 34, 36, 38 and 40. Each bus interface circuit responds to a destination address received on a respective address bus 42 and supplies an 8-bit voice sample on its associated transmit bus 44. A bus control circuit 46, which generates the addresses for a high speed module, also designates one of the input registers 48 of this module to receive the voice sample. As data is collected in the input registers 48 it is made available through a parallel-to-serial converter and multiplexer 50 that is controlled by a DS3 frame clock 52. A serial signal is supplied from the circuit 50 to a line interface circuit 54, and from there to the output terminal 24.

Similarly, as shown in FIG. 7, an incoming DS3 signal is passed through an interface 56 to a serial-to-parallel converter 58. This circuit 58 supplies signals to a clock generator 60 which synchronizes the operation of the high speed module. A bus control circuit 62, timed by the clock circuit 60, selects the voice samples which are placed on the receive bus 64 by the bus interface and buffer circuits 66. Simultaneously, the bus control circuit supplies an address to the bus interface circuit 68 of all the low speed modules connected to that bus. This address thus selects the proper low speed module, the proper DS1 line connected to that low speed module and the proper time slot in the selected DS1 line for transmission. The voice sample is then passed through a phase discriminator and encoder 70 and an interface circuit 72 to the output terminal 22 for the selected DS1 line.

Figure 8:
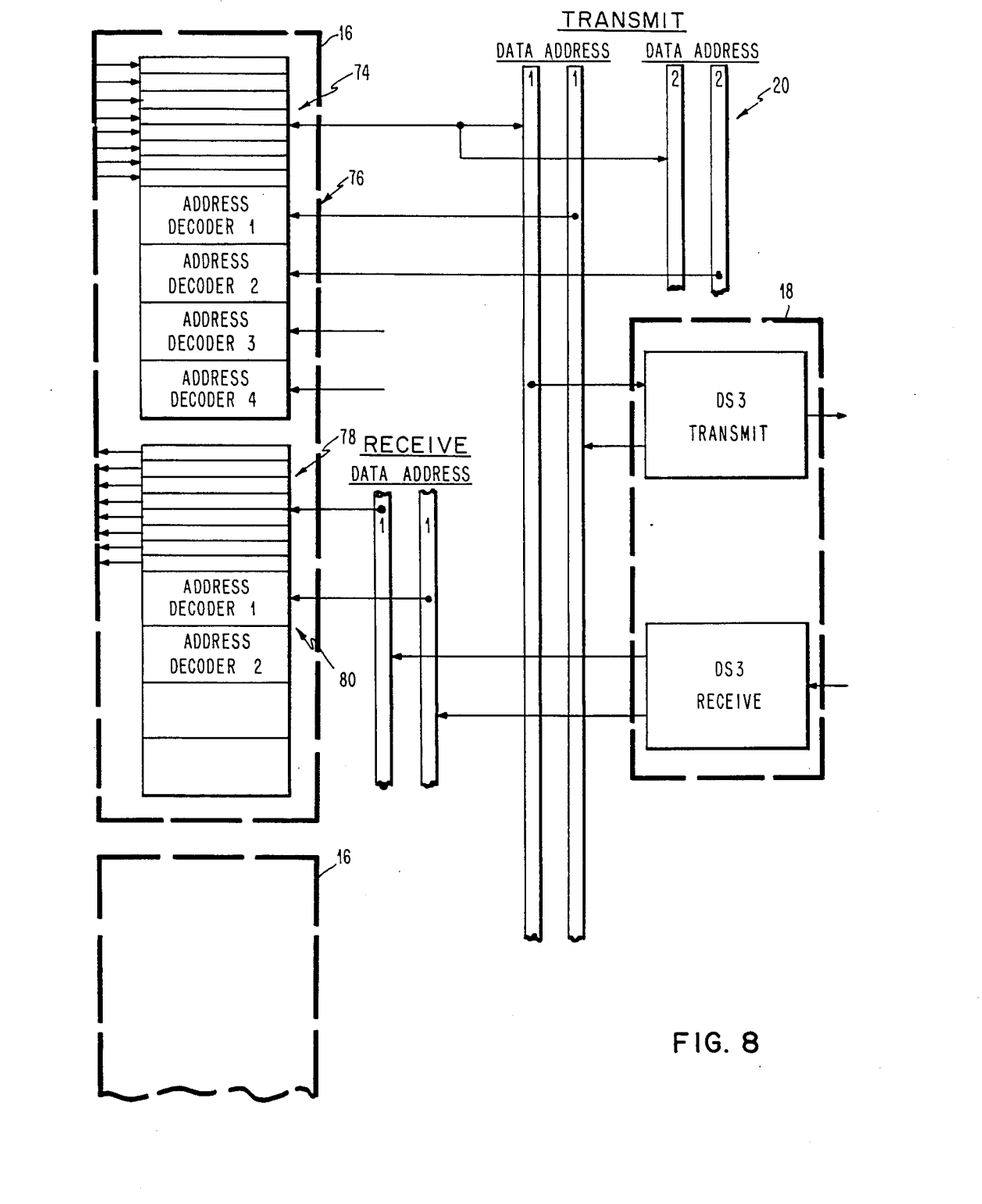
FIG. 8 is a block diagram illustrating how the low speed and high speed modules in the apparatus of FIG. 5 are connected to separate bus line sets.

FIG. 8 is a functional block diagram illustrating how the low speed modules 16 and high speed modules 18 are interconnected via the bus system 20. As mentioned previously, there are four separate transmit buses, each having data and address lines, and four separate receive buses, each having data and address lines. Each high speed module is connected to one transmit bus (both data and address lines) and one receive bus (both data and address lines). Each low speed module, on the other hand, is connected to *all* the transmit buses and all the receive buses. Voice samples received from a DS1 line are supplied to respective buffer registers 74 from which they are supplied to the transmit data bus lines at the proper times as selected by addresses received by the address decoders 76. Similarly, voice samples received from the high speed module 18 are latched into selected buffer registers 78 of the low speed module in response to addresses received by the address decoders 80.

Figure 9A:
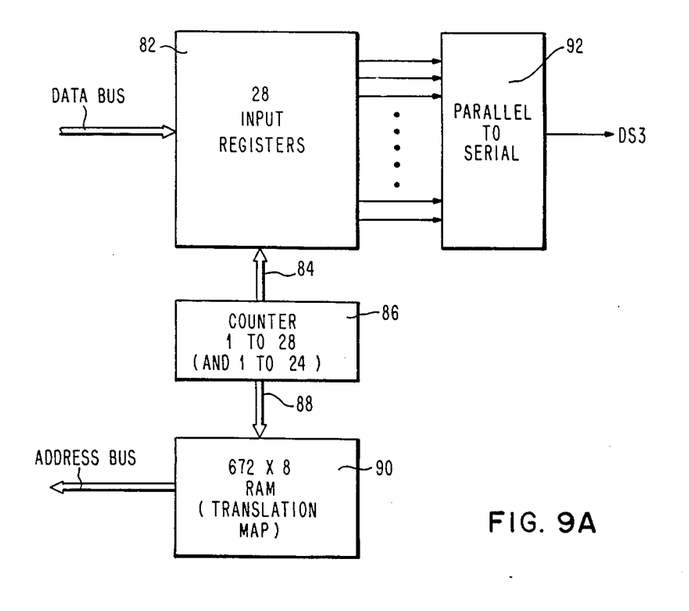
FIGS. 9A and 9B are block diagrams illustrating the internal operation of a high speed module for transmitting and receiving PCM voice channels on a duplex DS3 line.
Figure 9B:
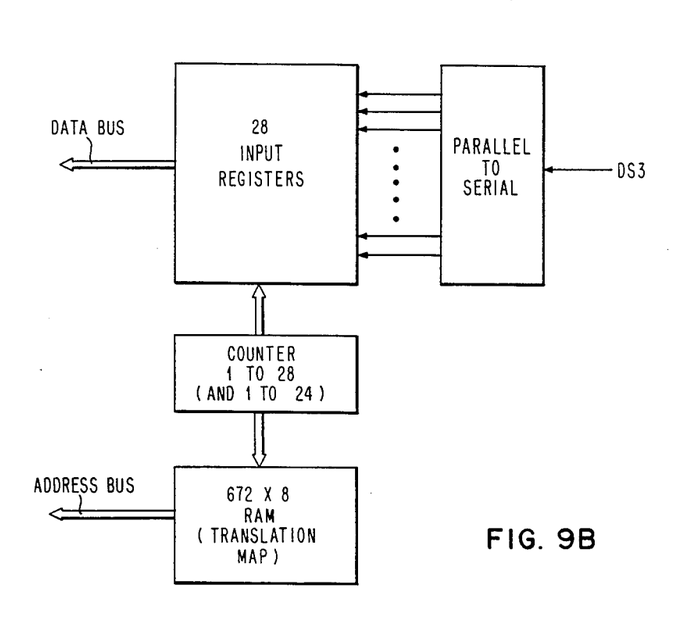
Figure 10:
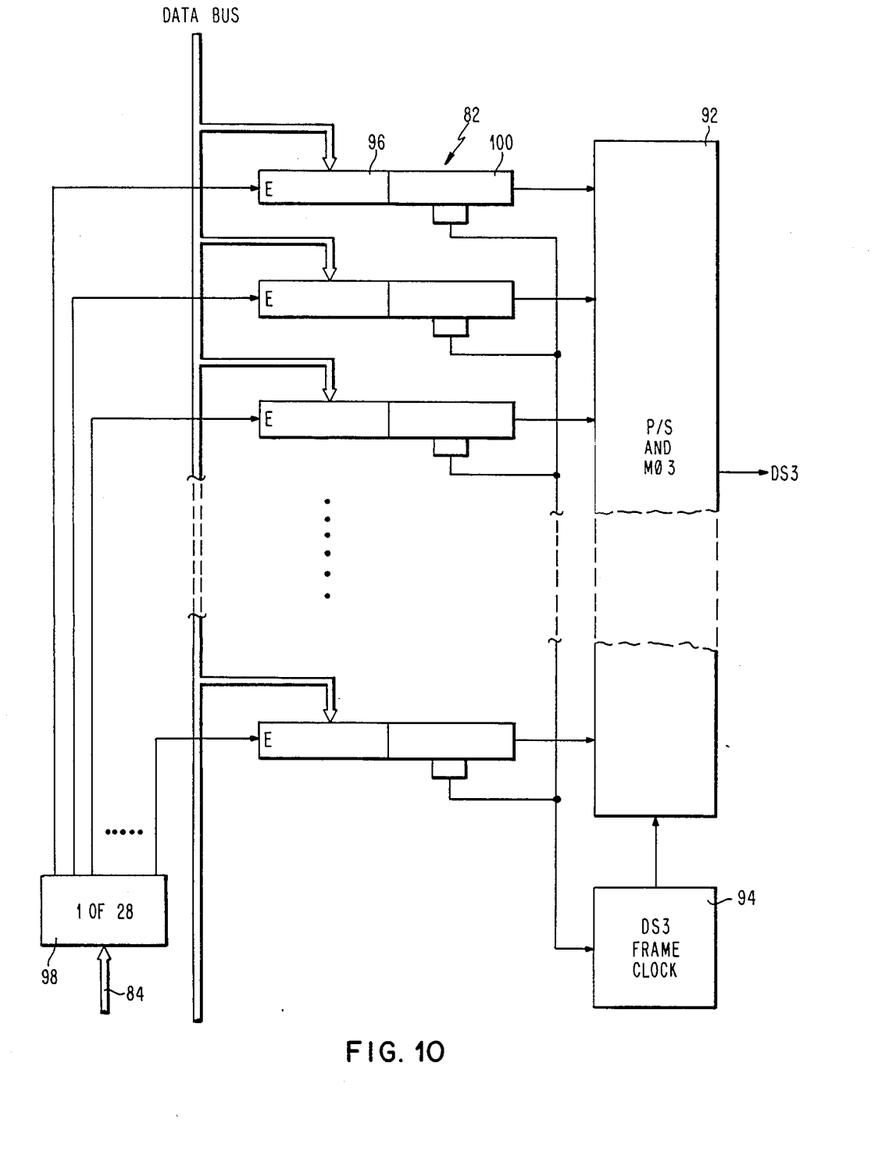
FIG. 10 is a block diagram further illustrating the operation of the high speed module of FIG. 9A.

FIGS. 9 and 10 illustrate the operation of the high speed modules in greater detail. FIG. 9A shows how data is passed from the data bus to the outgoing branch of the DS3 transmission line. FIG. 9B, which is nearly identical to FIG. 9A, shows how data is passed from the incoming branch of the DS3 line to the data bus.

Referring to FIG. 9A, it may be seen that voice samples, received from the data bus are latched into successive ones of 28 input registers 82. The successive registers are selected by the output 84 of a counter 86. The counter 86 serves to successively select one of 28 DS1 lines from a DS3 transmission line (1 to 28) and, for each DS1 line, one of 24 DS0 lines from a DS1 transmission line (1 to 24). Another output 88 of a counter 86 addresses a 672×8 RAM 90 which is programmed to contain 8-bit addresses at each of the 28 locations. When addressed, the RAM supplies the selected 8-bit address to the address bus of the bus system.

Each DS3 frame is created by a parallel to serial converter and multiplexer 92. As is more clearly shown in FIG. 10, this circuit 92 receives voice samples from all of the input registers 82 and stuffs successive samples into a DS3 frame with the aid of a DS3 frame clock 94. Each of the input registers 82 comprises two sections: an input latch 96 which is enabled by a signal from a decoder 98, and an output latch 100 which holds the voice sample for acceptance by the parallel-to-serial converter 92. When all of the output latches 100 are filled, a signal is presented to the DS3 frame clock and the frame stuffing operation is initiated.

The portion of the high speed module which handles the incoming branch of the DS3 line, as shown in FIG. 9B, is substantially identical and operates in the reverse manner to the outgoing branch portion just described.

Figure 11A:
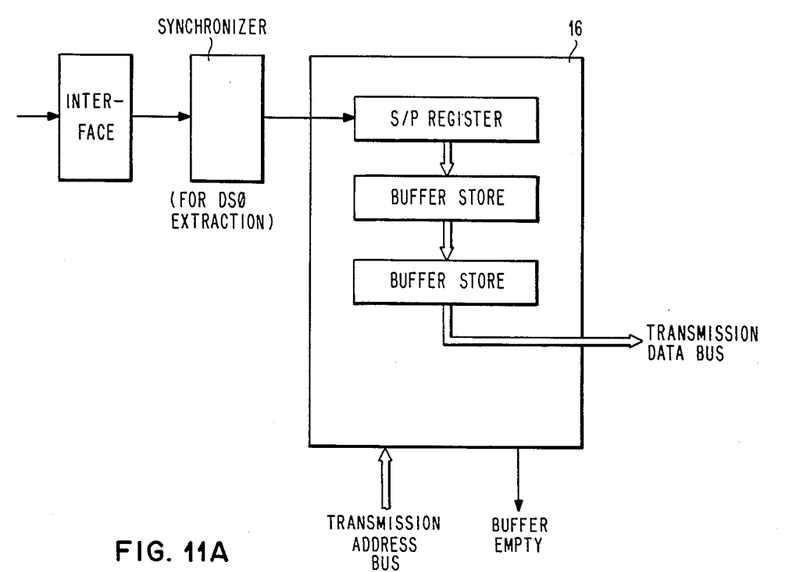
FIGS. 11A and 11B are block diagrams illustrating the operation of a low speed module.
Figure 11B:
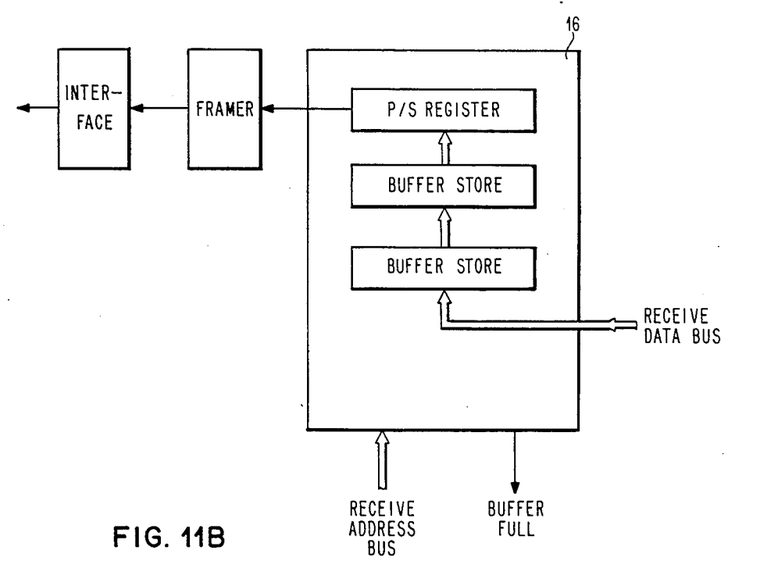

FIGS. 11A and 11B illustrate the operation of a low speed module 16. As shown in FIG. 11A, this module 16 receives a destination address via the transmission address bus. This will prompt the module to place an 8-bit voice sample on the transmission data bus. This sample is a parallel representation of the serial DS1 voice data that entered the module through the interface. The synchronous circuit identifies the DS0 voice samples within the DS1 signal, equivalent in fashion to the DS3 synchronizer shown in FIG. 7. Because the high speed module will present a transmission address more often than voice samples are available from the low speed module, a "buffer empty" indicator will alert the high speed module to the validity of the data on the transmission data bus. The structure of the low speed module 16 is exactly complementary in the receive direction, as shown in FIG. 11B. In this case a "buffer full" signal indicates when the buffers are free to receive data.

Figure 12:
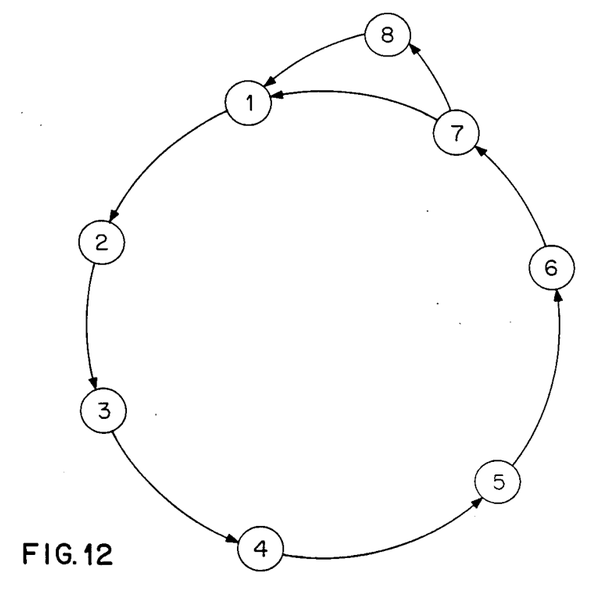
FIG. 12 is a state diagram illustrating the operation of the apparatus of FIG. 5 at the first level of multiplexing.
Figure 13:
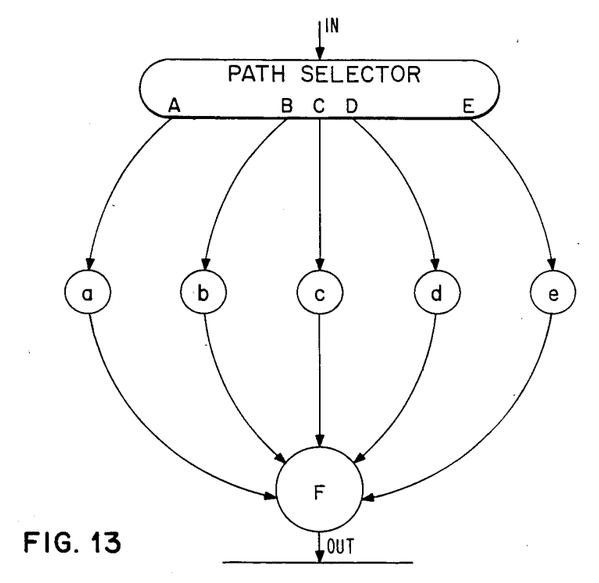
FIG. 13 is a state diagram illustrating the operation of the apparatus of FIG. 5 at the second level of multiplexing.

FIGS. 12 and 13 are state diagrams that illustrate the operation of the apparatus according to the invention. FIG. 12 shows the first level of multiplexing. In state 1 the apparatus "processes" (as explained below) DS1 signals #1, 2, 3 and 4. The relationship between states and DS1 signals in FIG. 12 is as follows:

| State | DS1 # |
|---|---|
| 1 | 1–4 |
| 2 | 5–8 |
| 3 | 9–12 |
| 4 | 13–16 |
| 5 | 17–20 |
| 6 | 21–24 |
| 7 | 25–28 |

Usually, the next state after state 7 will be state 1. A step number is assigned to each of the states, starting with step 1 for state 1. In other words, step 1=state 1, step 7=state 7, step 8=state 1, step 9=state 2, etc. After each 84 steps, the transition from state 7 will be to state 8. During this state, a control bit will be inserted into the DS3 serial bit stream.

Within each of the first 7 states, are the 5 sub-states a, b, c, d and e as shown in FIG. 13. When a state (1–7) is entered one of 5 paths will be selected (AF thru EF). The first time the state is entered, the selected path will be AF, which leads to sub-state a. If the state were for example #4, then sub-states a, b, c and d would correspond with DS1 signal #13, 14, 15 and 16 respectively. In sub-state a, a bit from DS1 signal #13 would be inserted into the DS3 serial bit stream. After this bit has been inserted, the state will be left, to continue to state #5. The next time state 4 is then entered, the selected path will be BF. On the third entry CF is selected, on the fourth DF, and on the fifth AF is returned to. This pattern is followed until the 49th entry, when EF is selected and a control bit is inserted into the DS3 serial bit stream. This pattern will be followed continuously with the following exceptions: During entry 246, 541, 836 and 1131 (paths AF, BF, CF and DF respectively) "stuffing" bits are inserted into the DS3 serial bit stream. A "stuffing" bit is a normal DS1 bit, but if the incoming DS1 is too slow to fill the available slot in the DS3 serial bit stream, the slot is left empty. The absence of a valid bit is indicated by the control bit inserted in sub-state e.

A similar stuffing process occurs in the procedure represented in FIG. 12. Here, a stuffing bit is inserted during states 1, 2, 3, 4, 5, 6 or 7 during steps 596, 1277, 1958, 2639, 3320, 4001 and 4682 respectively.

The maximum entry number is 1176. The maximum step number is 4760. After these entry and step numbers the entry and step counters are reset and the next entry or step is counted as step number 1.

There has thus been shown and described a novel apparatus for multiplexing PCM voice signals which fulfills all the objects and advantages sought therefor. Many changes, modifications, variations and other uses and applications of the subject invention will, however, become apparent to those skilled in the art after considering this specification and the accompanying drawings which disclose the preferred embodiment thereof. For example, although the present apparatus is primarily intended for the routing and connection of PCM voice channels, it can also be used for data channels containing no voice information but of the proper format to be handled by and transmitted on a voice channel network. All such changes, modifications, variations and other uses and applications which do not depart from the spirit and scope of the invention are deemed to be covered by the invention which is limited only by the claims which follow.

What is claimed is:

1. Apparatus for routing a plurality of PCM channels, received via transmission lines having one bit rate, into selected transmission lines having the same or a different bit rate, said apparatus comprising, in combination:
    (a) a plurality of first terminals adapted for connection to the incoming transmission lines of respective low speed, duplex PCM highways;
    (b) a plurality of second terminals adapted for connection to the outgoing transmission lines of respective low speed, duplex PCM highways;
    (c) a plurality of third terminals adapted for connection to the incoming transmission lines of respective high speed, duplex PCM highways;
    (d) a plurality of fourth terminals adapted for connection to the outgoing transmission lines of respective high speed, duplex PCM highways;
    (e) a bus network comprising:
        (1) a plurality of transmitting bus data lines;
        (2) a plurality of transmitting bus address lines;
        (3) a plurality of receiving bus data lines; and
        (4) a plurality of receiving bus address lines;
        said bus lines being grouped into sets for parallel transmission of PCM samples and destination addresses, respectively;

(f) a plurality of low speed modules, each low speed module coupling a plurality of said first terminals to each of said transmitting bus data line sets and coupling a plurality of said second terminals to each of said receiving bus data line sets, each low speed module also being connected to each of said transmitting bus address line sets and to each of said receiving bus address line sets;

(g) a plurality of high speed modules, each high speed module coupling a single third terminal to a separate one of said receiving bus data line sets and coupling a single fourth terminal to a separate one of said transmitting bus data line sets, each high speed module also being connected to a separate set of said transmitting bus address lines and to a separate set of said receiving bus address lines;

wherein each PCM channel on each PCM highway has associated therewith a unique address, and wherein each module includes means for supplying and receiving addresses from said bus address lines thereby supplying a destination address on an address bus whenever a PCM sample is applied to a data bus, whereby each PCM sample received on one PCM channel at a first or third terminal may be routed to any other PCM channel for outgoing transmission at a second or fourth terminal.

2. A bus interconnection system for routing a plurality of pulse code modulated telecommunication channels multiplexed into particular transmission groups including at least a relatively low speed group operating at least at bit rates of approximately 1.544 megabits per second and a relatively high speed transmission group operating at a much higher bit rate than said 1.544 megabits per second rate, wherein said higher bit rates are non-multiples of said low speed bit rates are are asynchronous to each other, the bus system comprising:

a data bus including a plurality of ports for providing access means to the bus system by each tranmission group, the access means permitting transmission and reception of data in parallel data format to and from the data bus; and an address bus for receiving or transmitting data associated with a unique memory location for temporary storage of data provided to or by the data bus in a particular location in a random access memory associated with at least one relatively high speed transmission group, wherein the random access memory is adapted for storing said relatively low speed group 8-bit samples in input registers of the random access memory;

means for multiplexing said relatively low speed groups 8-bit samples into at least one of said relatively high speed transmission groups; and means for coupling said multiplexed high speed groups onto a transmission line for outgoing transmission.

3. The bus interconnection system in accordance with claim 2 wherein associated with each transmission group is a serial-to-parallel converter for converting a serial transmission bit stream output of a particular transmission group to the parallel format for high speed bus system access and transmission.

4. The bus interconnection system in accordance with claim 3 wherein the serial-to-parallel converter associated with the high speed transmission group provides a parallel data stream to the data bus through a data bus interface means under the control of a data bus control means clocked by a clock generator for synchronizing the provision of data to the data bus.

5. The bus interconnection system in accordance with claim 2, wherein associated with each transmission group is a parallel-to-serial converter for converting the parallel data output accesses from the bus system to a serial data stream for transmission.

6. The bus interconnection system in accordance with claim 5 wherein an input register is connected between the parallel-to-serial converter and the bus system.

7. The bus interconnection system in accordance with claim 2 wherein the data bus comprises four transmit bus data lines and four receive bus data lines, one transmit and one receive line for each of four relatively high speed DS3 transmission groups.

8. The bus interconnection system in accordance with claim 7 wherein the data bus comprises eight wires for routing an 8-bit sample of an analog or data signal in parallel data format.

9. The bus interconnection system in accordance with claim 2 wherein transmission group transmit and receive circuitry for interfacing with the bus system comprises HCMOS logic and a clock frequency for clocking the operation of the bus system is approximately 6 megahertz.

10. The bus interconnection system in accordance with claim 2 wherein the address bus comprises transmit and receive bus address lines.

11. The bus interconnection system in accordance with claim 10 wherein each bus address line comprises eight wires for routing an 8-bit address of the random access memory.

12. Cross-connect apparatus for cross-connecting a plurality of different transmission rate signals in a plurality of relatively low speed pulse code modulated channels or channel groups operating at least at bit rates of approximately 1.544 megabits per second and a plurality of relatively high speed pulse code modulated channel groups operating at higher bit rates than said 1.544 megabits per second, said higher bit rates being non-multiples of said low speed bit rates, and said high and low speed channel groups being asynchronous to each other, the cross-connect apparatus a bus system comprising a like number of pulse code modulated data transmit and receive bus lines and transmit and receive address bus lines, the transmit and receive address bus lines for routing a unique address of a particular pulse code modulated channel;

byte stuffing means for providing internal synchronization between said asynchronously related and different rate signals;

whereby each pulse code modulated sample received on one of the pulse code modulated channels may be routed on the bus system to any other pulse code modulated channel for outgoing transmission; and a multiplexing means for multiplexing predetermined relatively low speed pulse code modulated channel groups to predetermined relatively high speed pulse code modulated channel groups for outgoing transmission.

13. Cross-connect apparatus for cross-connecting a plurality of relatively low speed pulse code modulated channels or channel groups operating at least at big rates of approximately 1.544 megabits per second and a plurality of relatively high speed pulse code modulated channel groups operating at much higher bit rates with respect to said bit rate of 1.544 megabits per second, said higher and low speed channels being asynchronous related to each other, the cross-connect apparatus     a bus system comprising a like number of pulse code modulated data transmit and receive bus lines and transmit and receive address bus lines, the transmit and receive address bus lines for routing a unique address of a particular pulse code modulated channel of a low speed channel group;

whereby each pulse code modulated sample received on one of the pulse code modulated channels of one of the low speed channel groups is either routed over the bus system to a predetermined pulse code modulated channel of another low speed channel group or is multiplexed into a high speed channel group for outgoing transmission, at least one multiplexing means for multiplexing predetermined relatively low speed pulse code modulated channels into a predetermined relatively high speed channel group for outgoing transmission, such that said high speed and low speed channel group bit rates are both multiples and non-multiples of each other and are internally synchronized.

* * * * *